US009291848B2

(12) United States Patent
Guo et al.

(10) Patent No.: US 9,291,848 B2
(45) Date of Patent: Mar. 22, 2016

(54) TRANSFLECTIVE LIQUID CRYSTAL PANEL BASED ON ADS DISPLAY MODE AND DISPLAY DEVICE

(71) Applicant: BEIJING BOE OPTOELECTRONICS TECHNOLOGY CO., LTD., Beijing (CN)

(72) Inventors: Renwei Guo, Beijing (CN); Qian Wang, Beijing (CN); Huijie Xie, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/080,056

(22) Filed: Nov. 14, 2013

(65) Prior Publication Data

US 2014/0139789 A1  May 22, 2014

(30) Foreign Application Priority Data

Nov. 16, 2012  (CN) .......................... 2012 1 0466950
Nov. 29, 2012  (CN) .......................... 2012 1 0500809

(51) Int. Cl.
*G02F 1/1335* (2006.01)
*G02F 1/13363* (2006.01)
*G02F 1/1343* (2006.01)
*G02F 1/1333* (2006.01)

(52) U.S. Cl.
CPC .......... *G02F 1/1335* (2013.01); *G02F 1/13363* (2013.01); *G02F 1/133555* (2013.01); *G02F 1/134309* (2013.01); *G02F 1/133371* (2013.01); *G02F 2001/133631* (2013.01); *G02F 2001/133638* (2013.01); *G02F 2001/134372* (2013.01); *G02F 2413/01* (2013.01)

(58) Field of Classification Search
CPC .......... G02F 1/13363; G02F 1/133634; G02F 1/133555; G02F 1/133371
See application file for complete search history.

(56) References Cited

U.S. PATENT DOCUMENTS

2006/0192913 A1  8/2006  Shutou et al.
2009/0066890 A1*  3/2009  Harding et al. ............... 349/106
2010/0225855 A1  9/2010  Lu et al.

FOREIGN PATENT DOCUMENTS

CN  1748159 A  3/2006
CN  102422206 A  4/2012
(Continued)

OTHER PUBLICATIONS

Extended European Search Report for European Patent Application No. 13191858.3 dated Jul. 14, 2014, 14pgs.
(Continued)

*Primary Examiner* — Phu Vu

(57) ABSTRACT

Embodiments of the invention disclose a transflective liquid crystal panel based on ADS display mode and a display device. Each pixel unit is provided with a transmissive region and a reflective region, a thickness of the liquid crystal layer in the transmissive region is larger than that of liquid crystal layer in the reflective region. Moreover, an optical retardation film and a reflection layer are disposed in a region corresponding to the reflective region; wherein the optical retardation film is adapted for compensating optical retardation caused by a difference in the thicknesses of the liquid crystal layer in the transmissive and reflective regions.

18 Claims, 12 Drawing Sheets

(56) References Cited

FOREIGN PATENT DOCUMENTS

CN 202939393 U 5/2013
JP 2008009155 A 1/2008

OTHER PUBLICATIONS

Partial European Search Report issued by European Patent Office, in European Application No. 13191858.3, dated Feb. 26, 2014, 6 pages.
First Office Action from State Intellectual Property Office of the People's Republic of China in Chinese Application No. 201210500809.1, issued Oct. 11, 2014; 9 pgs.
English translation of First Office Action from State Intellectual Property Office of the People's Republic of China in Chinese Application No. 201210500809.1, issued Oct. 11, 2014; 9 pgs.
Second Office Action from State Intellectual Property Office of the People's Republic of China in Chinese Application No. 201210500809.1, issued Dec. 17, 2014; 10 pgs.
English translation of Second Office Action from State Intellectual Property Office of the People's Republic of China in Chinese Application No. 201210500809.1, issued Dec. 17, 2014; 10 pgs.
Third Office Action from State Intellectual Property Office of the People's Republic of China in Chinese Application No. 201210500809.1, issued Mar. 30, 2015; 8 pgs.
English Translation of Third Office Action from State Intellectual Property Office of the People's Republic of China in Chinese Application No. 201210500809.1, issued Mar. 30, 2015; 8 pgs.
English abstract for CN1748159A (cited above).
English abstract for CN102422206A (cited above).
English abstract for CN202939393A (cited above).
English abstract for JP2008009155 (cited above).
Second Office Action issued by the Chinese Patent Office for Chinese Patent Application No. 201210500809.1 dated Dec. 17, 2014, ten (10) pages.
English translation of Second Office Action issued by the Chinese Patent Office for Chinese Patent Application No. 201210500809.1 dated Dec. 17, 2014, ten (10) pages.
English abstract of CN1748159A, one (1) page.
Partial European Search Report for European Patent Application No. 13191858.3 dated Feb. 26, 2014, six (6) pages.
First Office Action issued by the Chinese Patent Office for Chinese Patent Application No. 201210500809.1 dated Oct. 11, 2014, nine (9) pages.
English translation of First Office Action issued by the Chinese Patent Office for Chinese Patent Application No. 201210500809.1 dated Oct. 11, 2014, nine (9) pages.
English abstract of CN202939393U, one (1) page.
English abstract of CN102422206A, one (1) page.

* cited by examiner

TRANSFLECTIVE LIQUID CRYSTAL PANEL BASED ON ADS DISPLAY MODE AND DISPLAY DEVICE

CROSS REFERENCE TO RELATED APPLICATIONS

This application claims priority from Chinese National Application Nos. 201210466950.4 filed on Nov. 16, 2012 and 201210500809.1 filed on Nov. 29, 2012, the contents of which are incorporated herein by reference.

FIELD OF THE INVENTION

Embodiments of the invention relate to a transflective liquid crystal panel based on ADS display mode and a display device.

BACKGROUND

Liquid crystal panels do not generate light themselves and are classified into reflective liquid crystal panels, transmissive liquid crystal panels and transflective liquid crystal panels according to their light sources. A reflective liquid crystal panel uses ambient light around the liquid crystal panel as the illumination light source and a reflection surface for reflecting ambient light is disposed in the reflective liquid crystal panel. As there is no backlight in the reflective liquid crystal panel, its power consumption is relatively low. However, in case that the ambient light is weak, it is hard to view the displayed images, which causes a lot of limitations in use. As for a transmissive liquid crystal panel, a backlight source is disposed at the back of a Thin Film Transistor (TFT) array substrate and images are displayed by modulating the backlight emitted from the backlight source by the liquid crystal panel. The power consumption of the transmissive liquid crystal panel is relatively high as it needs to supply power to the backlight source.

A transflective liquid crystal panel has characteristics of both the reflective and the transmissive liquid crystal panels and is configured with both a backlight source and a reflection layer. When being used, the transflective liquid crystal panel may use both the backlight and the ambient light so as to have the advantages of both liquid crystal panels; therefore a good viewing quality can be provided under strong light or in a dark environment.

Currently, the liquid crystal panels are divided into Twisted Nematic (TN) liquid crystal panels, In Plane Switching (IPS) liquid crystal panels and Advanced Super Dimension Switch (ADS) liquid crystal panels and the like. A liquid crystal panel of ADS display mode generates a multi-dimensional electric field with both an electric field produced at edges of slit electrodes in a same plane and an electric field produced between a slit electrode layer and a plate-like electrode layer, so that liquid crystal molecules at all directions, which are located directly over the electrodes and between the slit electrodes in a liquid crystal cell, can be rotated, which enhances the work efficiency of liquid crystals and increases light transmittance, in comparison with the IPS liquid crystal panel. The liquid crystal panel in ADS display mode has the advantages of high resolution, high transmittance, low power consumption, wide viewing angle, high aperture ratio, low chromatic aberration, being free of push Mura, etc. However, there is no transflective liquid crystal displays (LCDs) based on the ADS display mode in conventional arts.

SUMMARY

Embodiments of the invention provides a transflective liquid crystal panel based on ADS display mode and a display device, for realization transflective liquid crystal displaying under ADS display mode.

An embodiment of the invention provides A transflective liquid crystal panel based on ADS display mode, comprising: a color filter substrate, a thin film transistor (TFT) array substrate and a liquid crystal layer disposed between the color filter substrate and the TFT array substrate, a plurality of pixel units being formed on the TFT array substrate; wherein, each pixel unit is provided with a transmissive region and a reflective region, a thickness of the liquid crystal layer in the transmissive region is larger than that of the reflective region;

an optical retardation film and a reflection layer are disposed in a region corresponding to the reflective region;

the reflection layer is disposed at a side of the TFT array substrate that faces the liquid crystal layer, the retardation film is adapted for compensating optical retardation caused by a difference between the thicknesses of the liquid crystal layer in the transmissive and reflective regions.

Another embodiment of the invention provides a display device comprising the transflective liquid crystal panel based on ADS display mode according to the embodiment of the invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1A:
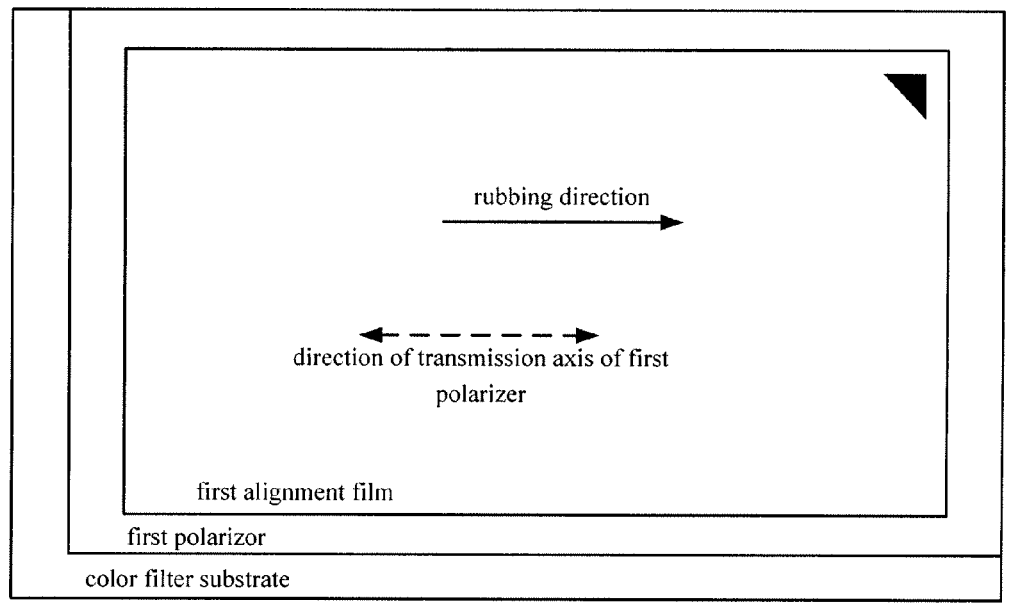
FIGS. 1a and 1b schematically illustrates an alignment direction of liquid crystal molecules in a liquid crystal layer of a transflective liquid crystal panel in accordance with an embodiment of the invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The thickness of each film, the size and the shape of each region in the drawings do not represent real proportion of an array substrate or a color filter substrate and are for illustrative purpose only.

An embodiment of the invention provides a transflective liquid crystal panel based on the ADS display mode, comprising: a color filter substrate, a thin film transistor (TFT) array substrate and a liquid crystal layer disposed between the color filter substrate and the TFT array substrate, a plurality of pixel units are formed on the TFT array substrate.

Each pixel unit has a transmissive region and a reflective region, a thickness of the liquid crystal layer in the transmissive region is larger than that of the liquid crystal layer in the reflective region.

An optical retardation film and a reflection layer are disposed in a region corresponding to the reflective region.

The reflection layer is disposed at a side of the TFT array substrate that faces the liquid crystal layer, the optical retardation film is adapted for compensating optical retardation (delay) caused by a difference between the thicknesses of the liquid crystal layers in the transmissive and reflective regions.

Upon images being displayed, as the liquid crystal layers in the transmissive and reflective regions are of different thicknesses, different retardation effects will be performed on the light beam by the liquid crystal layers of different thicknesses after the power is turned on (i.e., in an On state). The difference in the optical retardation may be compensated by disposing the optical retardation film in the reflective region, such that the light transmissivities in the reflective and transmissive regions in the same pixel unit match each other. Moreover, grayscales in the pixel unit may remain the same whenever the electric field is applied on or not, thereby achieving a transflective displaying effect.

As an example, the above transflective liquid crystal panel further comprises a first polarizer disposed on a side of the color filter substrate that is opposite to the liquid crystal layer, and a second polarizer disposed on a side of the TFT array substrate that is opposite to the liquid crystal layer. The transmission axes of the first polarizer and the second polarizer are perpendicular to each other.

When no electric field is applied, the liquid crystal molecules in the liquid crystal layer are aligned parallel to the transmission axis of the first or the second polarizer. That is, the liquid crystal molecules are not rotated upon no electrical field being applied, thus no optical retardation is performed on the transmitted light. Moreover, only light linearly polarized in the same direction as the transmission axis of a polarizer may pass through the polarizer, and the liquid crystal panel is therefore dark upon no electric field being applied.

Furthermore, in order to make parallel alignment of the liquid crystal molecules in the liquid crystal layer, the transflective liquid crystal panel may comprises a first alignment film and a second alignment film. The first alignment film is disposed on a side of the color filter substrate that faces the liquid crystal layer, and the second alignment film is disposed on a side of the TFT array substrate that faces the liquid crystal layer.

Figure 1B:
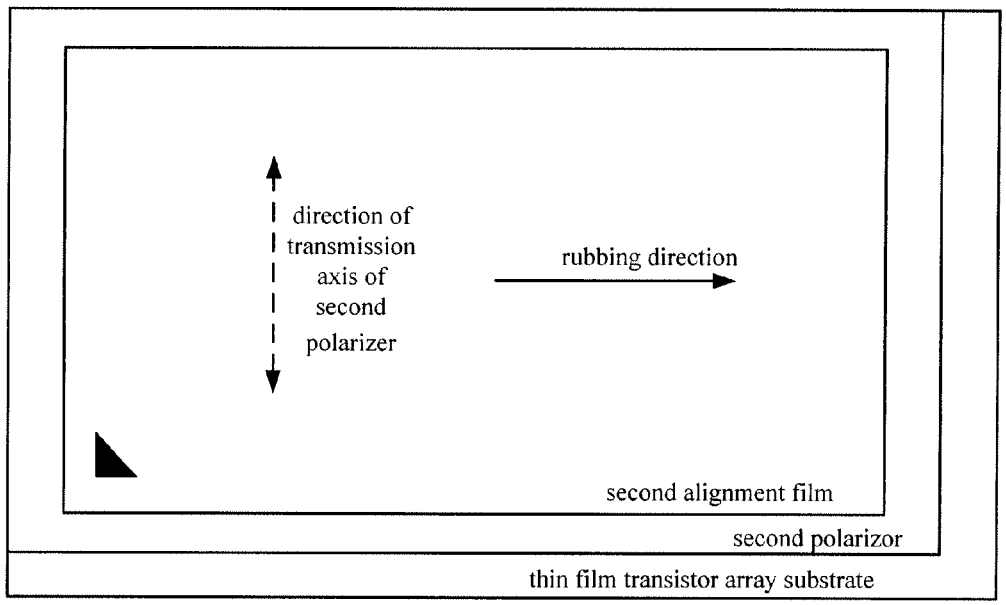

In an embodiment, as illustrated in FIGS. 1a and 1b, the rubbing direction of the first and second alignment films may be configured as the same as the transmission axis of the first polarizer, that is, perpendicular to the transmission axis of the second polarizer. Alternatively, the rubbing direction of the first and second alignment films may be configured as the same as the transmission axis of the second polarizer, that is, perpendicular to the transmission axis of the first polarizer. In this way, the liquid crystal molecules are aligned parallel to their long axis under the action of the alignment films upon no electric field being applied.

Specifically, in the above ADS display mode liquid crystal panel, a first ITO electrode is disposed on the TFT array substrate, a second ITO is disposed on and insulated from the first ITO electrode. A multidimensional electric field is generated upon a voltage being applied across the two electrodes, such that the liquid crystal molecules in the electric field are rotated under the effect of the electric field and thus optical retardation is performed on the transmitted polarized light.

In an embodiment, the reflection layer in the reflective region of the above transflective liquid crystal panel is generally disposed on a side of the first ITO electrode that is opposite to the second ITO electrode and electrically connected to the first ITO electrode. For example, the reflection layer may be made of a metal material and polarized light will be subjected to a half wavelength retardation after being reflected by the reflection layer.

As an example, the optical retardation film disposed in the reflection region of each pixel unit of the above transflective liquid crystal panel may be disposed on a side of the color filter substrate that faces the liquid crystal layer, that is, on the color filter substrate. It may also be disposed on a side of the TFT array substrate that faces the liquid crystal layer, that is, disposed on the TFT array substrate.

Furthermore, to make the thickness of the liquid crystal layer in the transmissive region of the pixel unit larger than that of the liquid crystal layer in the reflective region, a protrusion may be disposed in the reflective region of each pixel unit of the above transflective liquid crystal panel. A thickness of the protrusion is equal to the difference in the thicknesses of the liquid crystal layers in the transmissive region and the reflective region, such that the thickness of the liquid crystal layer may be controlled by adjusting the thickness of the protrusion.

As an example, when the optical retardation film is disposed on the side of the color filter substrate that faces the liquid crystal layer, the protrusion is disposed on a side of the optical retardation film that faces the liquid crystal layer. When the optical retardation film is disposed on the side of the TFT array substrate that faces the liquid crystal layer, the protrusion is disposed between the optical retardation film and the TFT array substrate.

To facilitate the implementation, the thickness of the liquid crystal layer in the transmissive region of the above transflective liquid crystal layer is generally set as twice that of the liquid crystal layer in the reflective region, that is, the thickness of the protrusion is half a cell gap. Accordingly, the optical retardation film is set as a quarter wavelength retardation film.

In the following, the transflective liquid crystal panel will be described in detail with reference to embodiments, wherein the optical retardation film is a quarter wavelength (λ/4) retardation film and the thickness of the liquid crystal layer in the transmissive region is twice that of the liquid crystal layer in the reflective region.

Embodiment 1 an optical retardation film in the reflective region is disposed on a TFT array substrate.

Figure 2A:
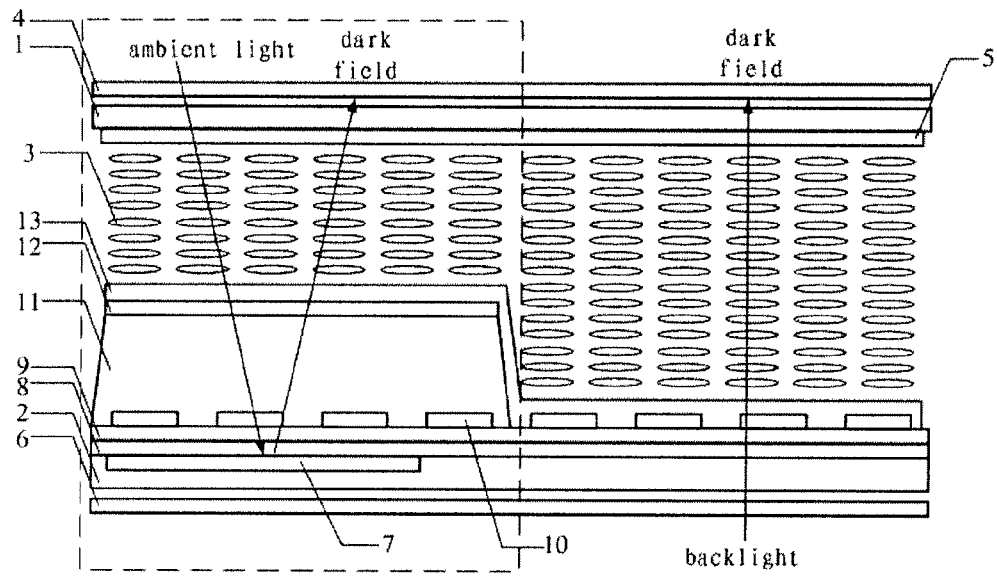
FIG. 2a schematically illustrates a configuration under power-off state in accordance with Embodiment 1 of the invention.

As illustrated in FIG. 2a, a liquid crystal layer 3 is disposed between a color filter substrate 1 and a TFT array substrate 2. A first polarizer 4 is disposed on a side of the color filter substrate 1 that is opposite to the liquid crystal layer 3, a first alignment film 5 is disposed on a side of the color filter substrate 1 that faces the liquid crystal layer 3. A second polarizer 6 is disposed on a side of the TFT array substrate 2 that is opposite to the liquid crystal layer 3, a reflection layer 7, a first ITO electrode 8, an insulating layer 9, a second ITO electrode 10, a protrusion 11, a λ/4 retardation film 12, and a second alignment film 13 are sequentially disposed on a side of the TFT array substrate 2 that faces the liquid crystal layer 3. The reflection layer 7, the protrusion 11 and the λ/4 retardation film 12 are disposed in the reflective region (indicated by a dashed box in FIG. 2a). The transmission axis of the first polarizer 4 is in a horizontal direction, the transmission axis of the second polarizer 6 is perpendicular to the paper. (the horizontal direction and the direction perpendicular to the paper are only an example of the direction of the transmission axes. For example, the horizontal direction refers to a direction parallel to the substrate in the sectional view.) The rubbing direction of the first alignment film 5 and the second alignment film 13 are in the horizontal direction. For example, the transmission axes of the first polarizer 4 and the second polarizer 6 are respectively along two directions perpendicular to each other in a plane parallel to the color filter substrate or the TFT array substrate.

Figure 2B:
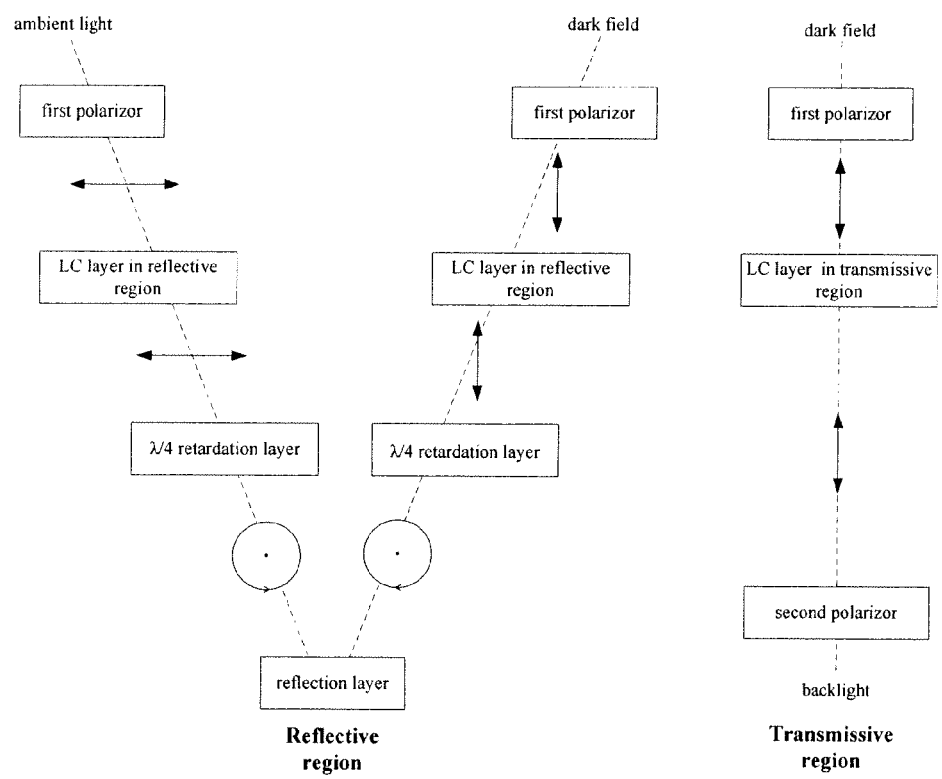
FIG. 2b schematically illustrates a graph simulating light beams under power-off state in accordance with Embodiment 1 of the invention.

Upon no voltage being applied to the liquid crystal panel, both the transmissive region and the reflective region are dark, and the detailed light beam simulation graph is illustrated in FIG. 2b. In the reflective region, the transmission axis of the first polarizer 4 is in the horizontal direction, therefore the ambient light passes through the first polarizer 4 and generates light linearly polarized in the horizontal direction. As the liquid crystal molecules of the liquid crystal layer 3 in the reflective region are aligned in the parallel direction, no retardation is imposed on the light linearly polarized in the horizontal direction when passing through the liquid crystal layer 3. The light linearly polarized in the horizontal direction is turned into left-handed circularly polarized (LHCP) light after being subjected to a phase retardation by the λ/4 retardation film 12. The LHCP light is turned into right-handed circularly polarized (RHCP) light after being reflected by the metal of the reflection layer 7. The RHCP light is turned into light linearly polarized in the perpendicular direction after passing through the λ/4 retardation film 12. The light linearly polarized in the perpendicular direction undergoes no retardation after passing through the reflective region of the liquid crystal layer 3. At this point, the polarization direction of the light linearly polarized in the perpendicular direction is perpendicular to the transmission axis of the first polarizer 4, thereby forming a dark field in the reflective region. In the transmissive region, the transmission axis of the second polarizer 6 is perpendicular to the paper, the backlight from the backlight source is thus turned into light linearly polarized in the perpendicular direction after passing through the second polarizer 6. As the liquid crystal molecules in the liquid crystal layer 3 of the transmissive region are aligned in the parallel direction, the light linearly polarized in the perpendicular direction experiences no retardation after passing through the liquid crystal layer. At this point, the polarization direction of the light linearly polarized in the perpendicular direction is perpendicular to the transmission axis of the first polarizer 4, thereby forming a dark region in the transmissive region.

Figure 3A:
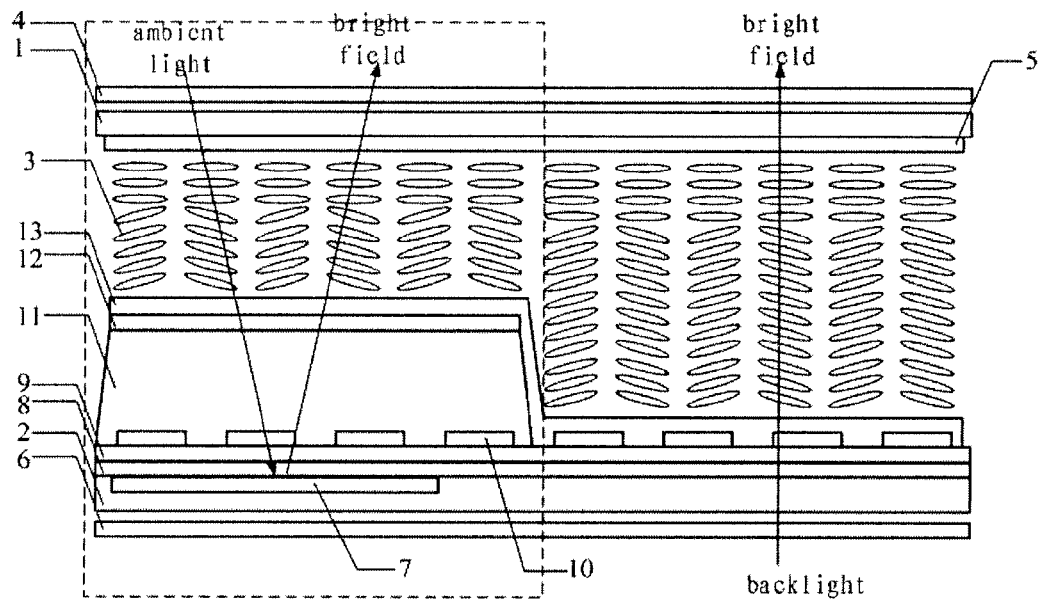
FIG. 3a schematically illustrates a configuration under power-on state in accordance with Embodiment 1 of the invention.

Upon a voltage being applied to the liquid crystal panel, the liquid crystal molecules in the liquid crystal layers of both the transmissive region and the reflective region are rotated and aligned under the action of the edge field. The polarized light is subjected to a phase retardation when passing through the rotated liquid crystal molecules, as illustrated in FIG. 3a. As the thicknesses of the liquid crystal layers 3 in the transmissive and reflective regions are different, the retardation effects on the polarized light are different as well. The liquid crystal layer 3 in the transmissive region exhibits a λ/2 optical retardation, while that in the reflective region exhibits a λ/4 optical retardation.

Figure 3B:
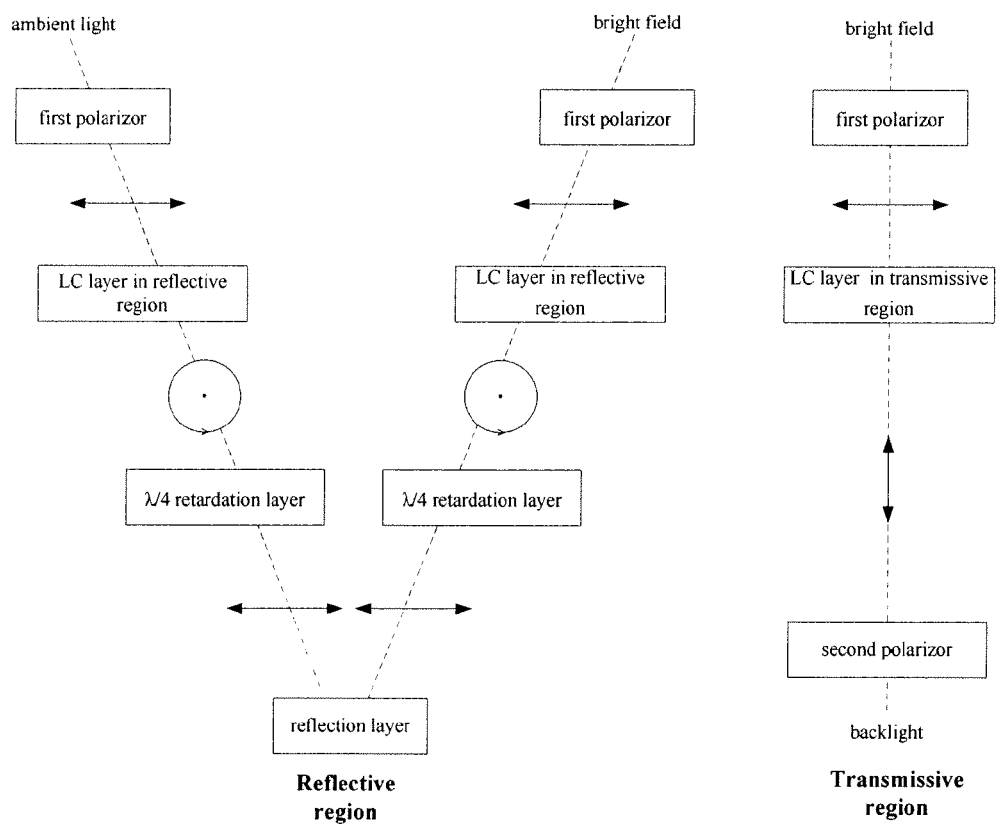
FIG. 3b schematically illustrates a graph simulating light beams under power-on state in accordance with Embodiment 1 of the invention.

Upon the voltage being applied to the liquid crystal panel, both the transmissive region and the reflective region are bright, and the detail light beam simulation graph is illustrated in FIG. 3b. In the reflective region, the transmission axis of the first polarizer 4 is in the horizontal direction, therefore the ambient light passes through the first polarizer 4 and generates light linearly polarized in the horizontal direction. As the liquid crystal layer 3 in the reflective region has a λ/4 optical retardation effect on the light, the light linearly polarized in the horizontal direction is turned into LHCP light after passing through the liquid crystal layer 3. The LHCP light is turned into light linearly polarized in the horizontal direction after passing through the λ/4 retardation film 12. The light linearly polarized in the horizontal direction is turned into LHCP light after being reflected by the metal of the reflection layer 7 and passing through the λ/4 retardation film 12. The LHCP is turned into light linearly polarized in the horizontal direction after the phase retardation by the liquid crystal layer 3 in the reflective region. At this point, the polarization direction of the light linearly polarized in the horizontal direction is the same as the transmission axis of the first polarizer 4, thereby forming a bright field in the reflective region. In the transmissive region, the transmission axis of the second polarizer 6 is perpendicular to the paper, the backlight from the backlight source is thus turned into light linearly polarized in the perpendicular direction after passing through the second polarizer 6. As the liquid crystal layer 3 in the transmissive region has a ½ optical retardation effect on the light, the light linearly polarized in the perpendicular direction is turned into light linearly polarized in the horizontal direction after passing through the liquid crystal layer 3 in the transmissive region. At this point, the polarization direction of the light linearly polarized in the horizontal direction is parallel to the transmission axis of the first polarizer 4, thereby forming a bright field in the transmissive region.

It is seen from the above description that the retardation film compensates for the optical retardation caused by the difference in the thicknesses of the liquid crystal layers in the transmissive region and the reflective region. For example, the phase retardation amount of the retardation film is configured so that a polarization state of the ambient light after it passes through the first polarizer and then through the liquid crystal layer in the reflective region and the optical retardation film, is reflected by the reflection layer, and passes through the liquid crystal layer in the reflective region and the retardation film once again and arrives at the first polarizer for a second time is the same as a polarization state of the backlight after it passes through the second polarizer and then through the liquid crystal layer in the transmissive region and arrives at the first polarizer.

Figure 4A:
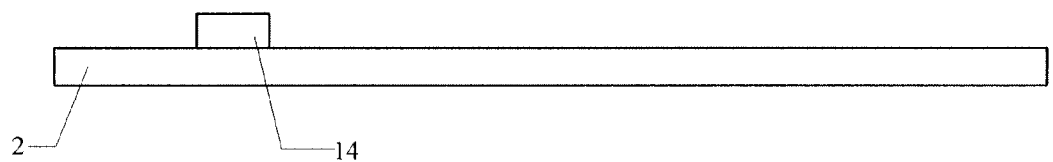
FIGS. 4a to 4k schematically illustrate each step for fabricating a TFT array substrate in accordance with Embodiment 1 of the invention.
Figure 4B:
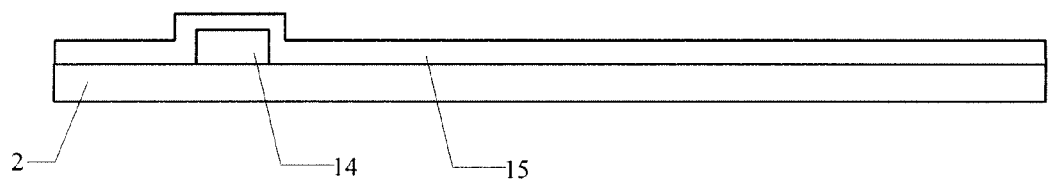
Figure 4C:
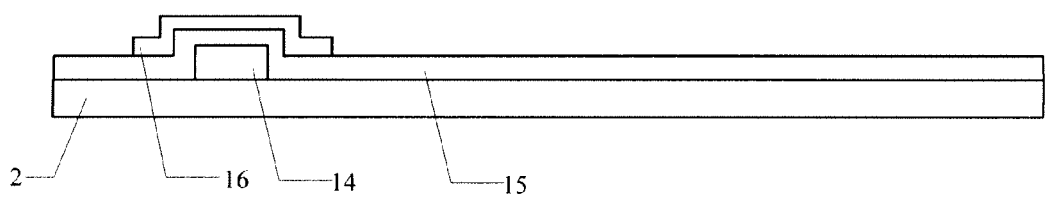
Figure 4D:
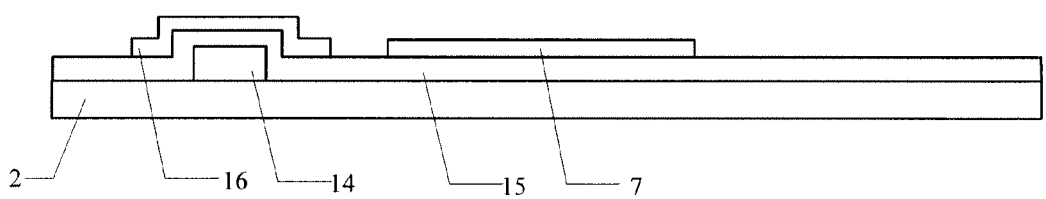
Figure 4E:
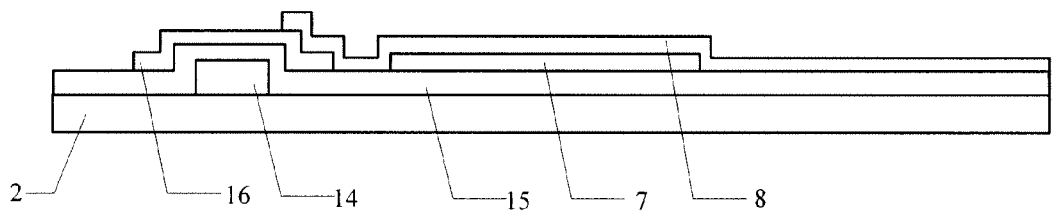
Figure 4F:
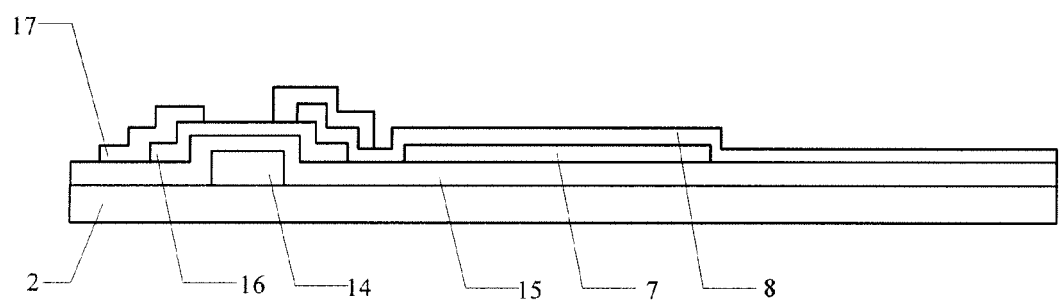
Figure 4G:
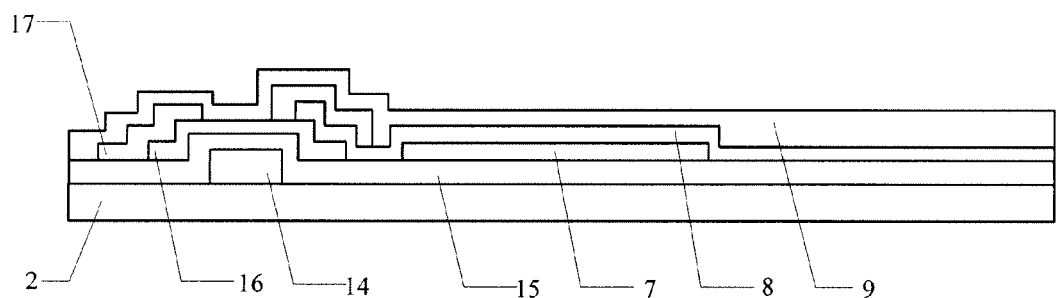
Figure 4H:
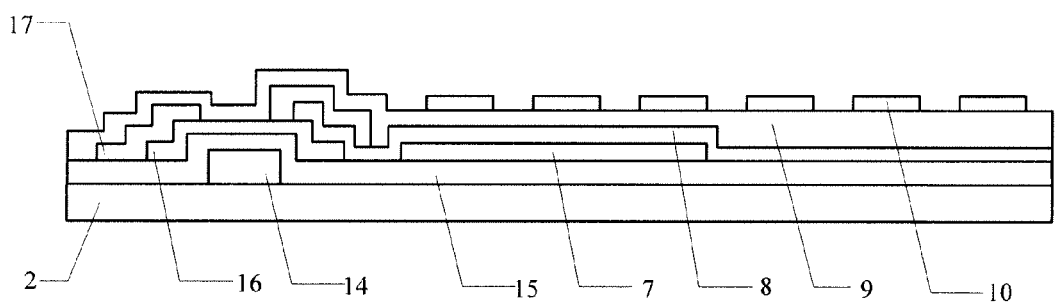
Figure 4I:
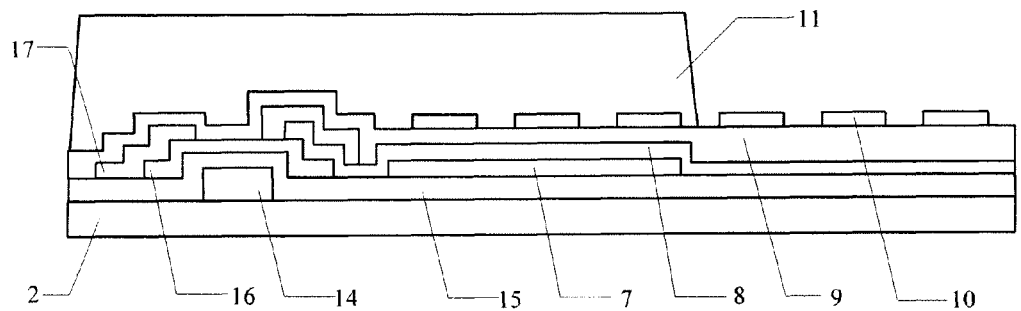
Figure 4J:
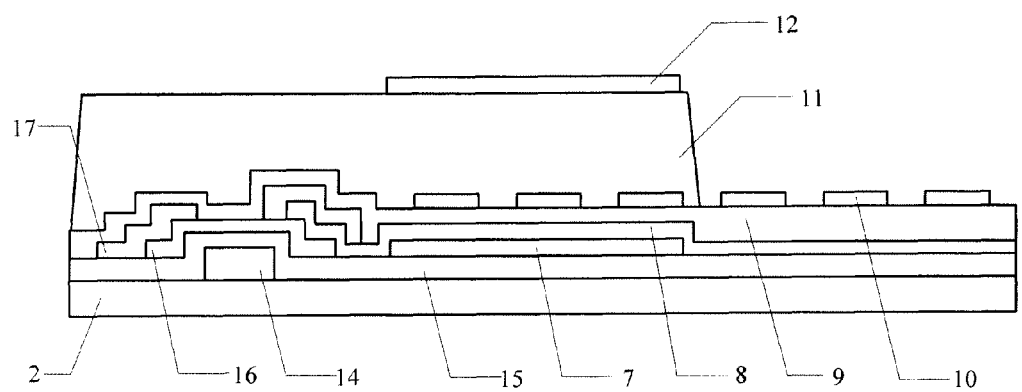
Figure 4K:
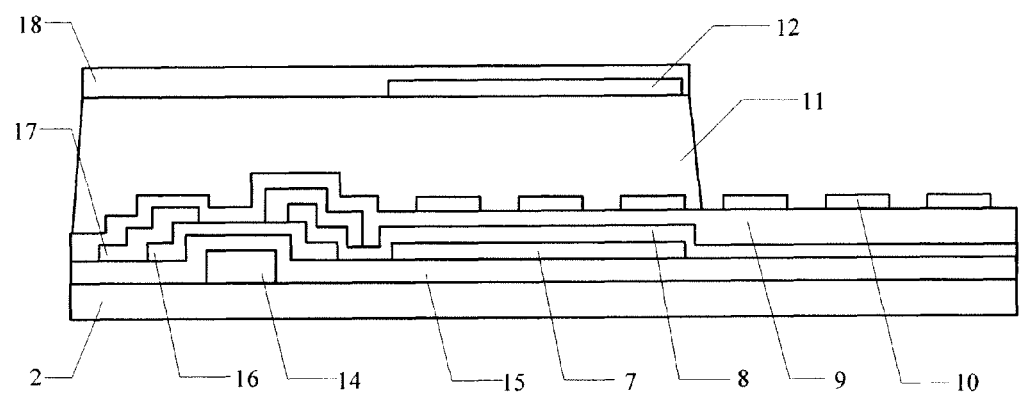

As an example, a process for fabricating the TFT array substrate of the transflective liquid crystal panel having the optical retardation film of the reflective region disposed on the TFT array substrate is illustrated in FIGS. 4a to 4k, which comprises the following steps:

(1) forming a gate electrode 14 on a substrate as illustrated in FIG. 4a;

(2) forming a gate insulating layer 15 on the gate electrode as illustrated in FIG. 4b;

(3) depositing an active layer 16 on the gate insulating layer 15 as illustrated in FIG. 4c;

(4) forming a reflection layer 7, for example, by sputtering, on a region of the gate insulating layer 15 that corresponds to the reflective region as illustrated in FIG. 4d; for example, aluminum may be sputtered to form the reflection layer 7;

(5) forming a first ITO electrode 8, for example, by sputtering, on the reflection layer 7 as illustrated in FIG. 4e;

(6) forming source/drain electrodes 17 respectively, for example, by sputtering, on the first ITO electrode 8 and the active layer 16 as illustrated in FIG. 4f;

(7) depositing an insulating (PVX) layer 9 on the source/drain electrodes 17 and the first ITO electrode 8 as illustrated in FIG. 4g;

(8) forming a strip-like second ITO electrode 10, for example, by sputtering, on the insulating (PVX) layer 9 as illustrated in FIG. 4h;

(9) depositing a protrusion 11 on a region of the second ITO electrode 10 that corresponds to the reflective region, a height of the protrusion is half the cell gap, as illustrated in FIG. 4i;

(10) depositing a λ/4 optical retardation film 12 on the region of the protrusion 11 that corresponds to the reflective region as illustrated in FIG. 4j;

(11) optionally, further depositing a protection film 18 on the λ/4 optical retardation film 12 as illustrated in FIG. 4k.

Figure 5A:
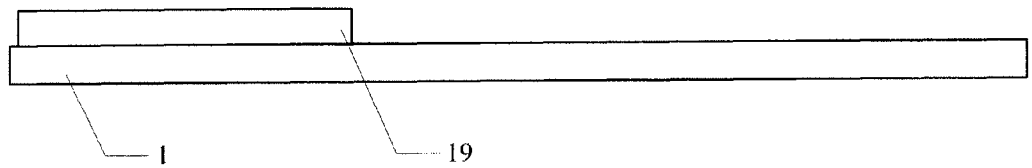
FIGS. 5a to 5c schematically illustrate each step for fabricating a color filter substrate in accordance with Embodiment 1 of the invention.
Figure 5B:
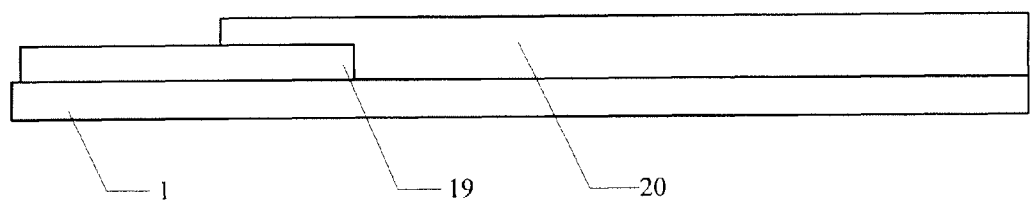
Figure 5C:
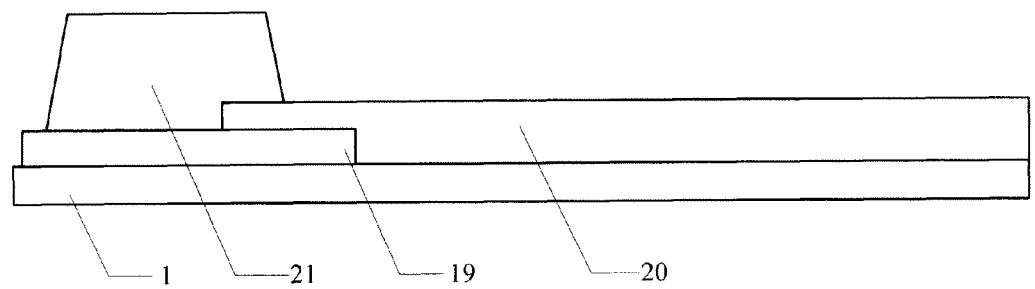

Accordingly, a process for fabricating the color filter substrate of the transflective liquid crystal panel having the optical retardation film of the reflective region disposed on the TFT array substrate is illustrated in FIGS. 5a to 5c which comprises the following steps:

(1) depositing an organic resin (BM) layer 19 to form a black matrix region as illustrated in FIG. 5a;

(2) depositing a color filter resin (CR) layer 20 on the organic resin (BM) layer 19 as illustrated in FIG. 5b;

(3) forming a post spacer (PS) layer 21 on the organic resin (BM) layer 19 and the color filter resin (CR) layer 20 as illustrated in FIG. 5c.

Figure 6:
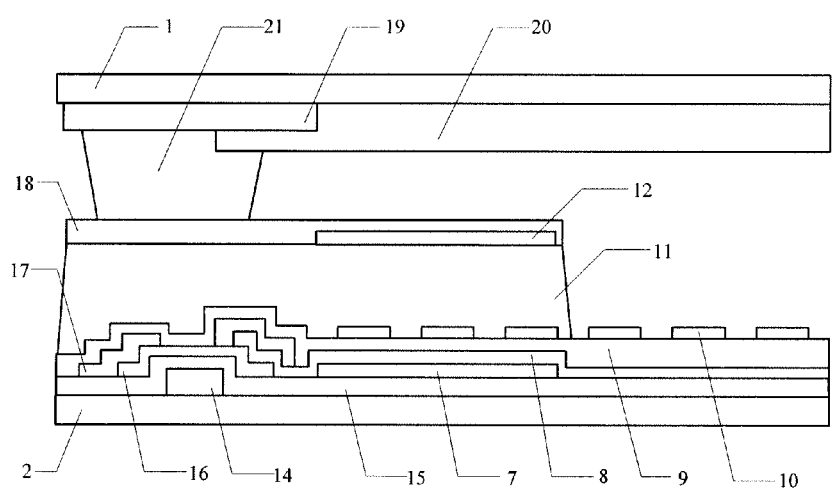
FIG. 6 schematically illustrates a configuration after cell assembly in accordance with Embodiment 1 of the invention.

After forming the TFT array substrate and the color filter substrate with the above processes, a parallel alignment agent is applied on both the color filter substrate and the TFT array substrate, to form a first alignment film and a second alignment film respectively on the color filter substrate and the TFT array substrate. Then color filter substrate and the TFT array substrate are cell assembled to form the liquid crystal panel as illustrated in FIG. 6 (in which the first and second alignment films are not shown). The cell assembly process used in the embodiment of the invention is not distinctly different from the conventional arts and will not be elaborated here.

Embodiment 2

An optical retardation film in the reflective region is disposed on the color filter substrate.

Figure 7A:
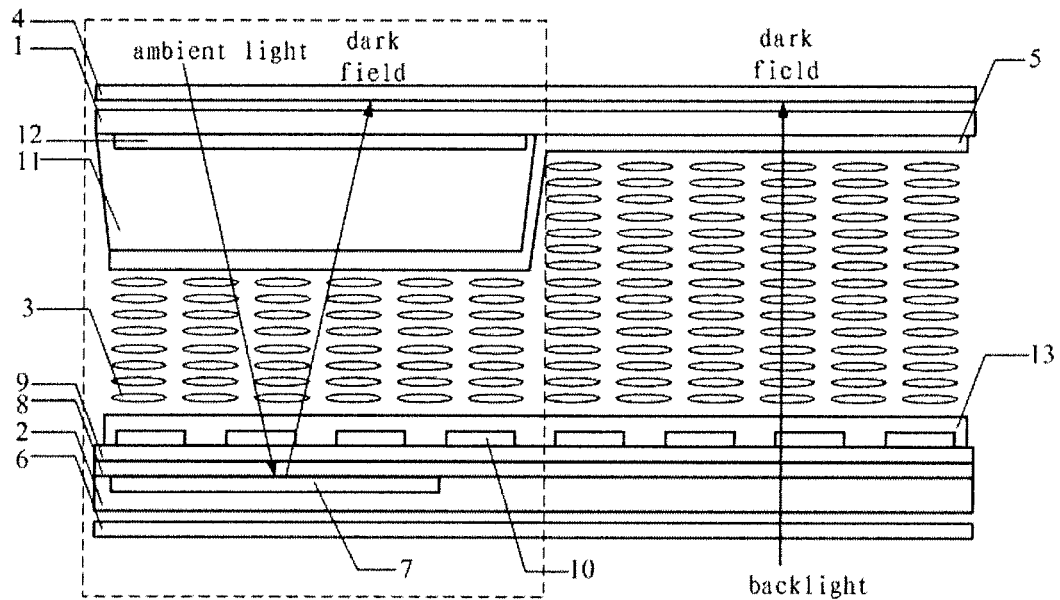
FIG. 7a schematically illustrates a configuration under power-off state in accordance with Embodiment 2 of the invention.

As illustrated in FIG. 7a, a liquid crystal layer 3 is disposed between a color filter substrate 1 and a TFT array substrate 2. A first polarizer 4 is disposed on a side of the color filter substrate 1 that is opposite to the liquid crystal layer 3, a λ/4 retardation film 12, a protrusion 11, and a first alignment film 5 are sequentially disposed on a side of the color filter substrate 1 that faces the liquid crystal layer 3. A second polarizer 6 is disposed on a side of the TFT array substrate 2 that is opposite to the liquid crystal layer 3, a reflection layer 7, a first ITO electrode 8, an insulating layer 9, a second ITO electrode 10, and a second alignment film 13 are sequentially disposed on a side of the TFT array substrate 2 that faces the liquid crystal layer 3. The reflection layer 7, the protrusion 11 and the λ/4 optical retardation film 12 are disposed in the reflective region (indicated by a dashed box in FIG. 7a). The transmission axis of the first polarizer 4 is in the horizontal direction, the transmission axis of the second polarizer 6 is perpendicular to the paper. Rubbing directions of the first alignment film 5 and the second alignment film 13 are in the horizontal direction.

Figure 7B:
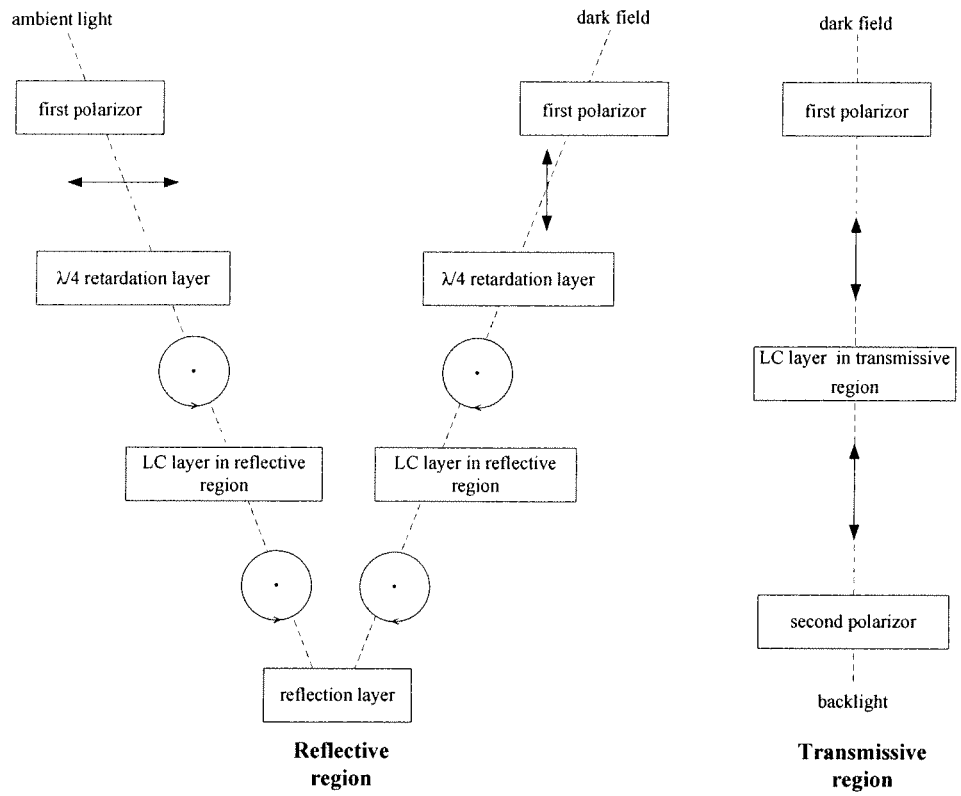
FIG. 7b schematically illustrates a graph simulating light beams under power-off state in accordance with Embodiment 2 of the invention.

Upon no voltage being applied to the liquid crystal panel, both the transmissive region and the reflective region are dark, and the detailed light beam simulation graph is illustrated in FIG. 7b. In the reflective region, the transmission axis of the first polarizer 4 is in the horizontal direction, therefore the ambient light passes through the first polarizer 4 and generates light linearly polarized in the horizontal direction. The light linearly polarized in the horizontal direction is turned into LHCP light after being subjected to a phase retardation by the λ/4 retardation film 12. As the liquid crystal molecules of the liquid crystal layer 3 in the reflective region are aligned in the parallel direction, no retardation is imposed on the LHCP light when passing through the liquid crystal layer 3. The LHCP light is turned into RHCP light after being reflected by the metal of the reflection layer 7. No retardation is imposed on the LHCP light when passing through the liquid crystal layer 3 in the reflective region. The RHCP light is turned into light linearly polarized in the perpendicular direction after passing through the λ/4 retardation film 12. At this point, the polarization direction of the light linearly polarized in the perpendicular direction is perpendicular to the transmission axis of the first polarizer 4, thereby forming a dark field in the reflective region. In the transmissive region, the transmission axis of the second polarizer 6 is perpendicular to the paper, the backlight from the backlight source is thus turned into light linearly polarized in the perpendicular direction after passing through the second polarizer 6. As the liquid crystal molecules in the liquid crystal layer 3 of the transmissive region is aligned in the parallel direction, the light linearly polarized in the perpendicular direction experiences no retardation after passing through the liquid crystal layer. At this point, the polarization direction of the light linearly polarized in the perpendicular direction is perpendicular to the transmission axis of the first polarizer 4, thereby forming a dark field in the transmissive region.

Figure 8A:
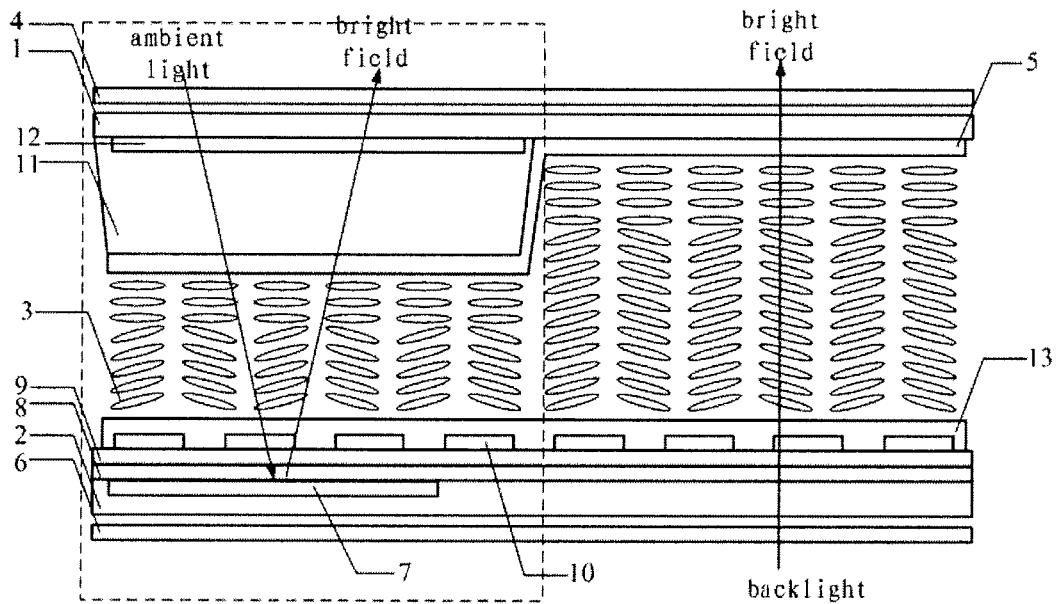
FIG. 8a schematically illustrates a configuration under power-on state in accordance with Embodiment 2 of the invention.

Upon a voltage being applied to the liquid crystal panel, the liquid crystal molecules in the liquid crystal layers of both the transmissive region and the reflective region are rotated and aligned under the action of the edge field effect. The polarized light is subjected to a phase retardation when passing through the rotated liquid crystal molecules, as illustrated in FIG. 8a. As the thicknesses of the liquid crystal layers 3 in the transmissive and reflective regions are different, the retardation effects on the polarized light are different as well. The liquid crystal layer 3 in the transmissive region exhibits a λ/2 optical retardation, while that in the reflective region exhibit a λ/4 optical retardation.

Figure 8B:
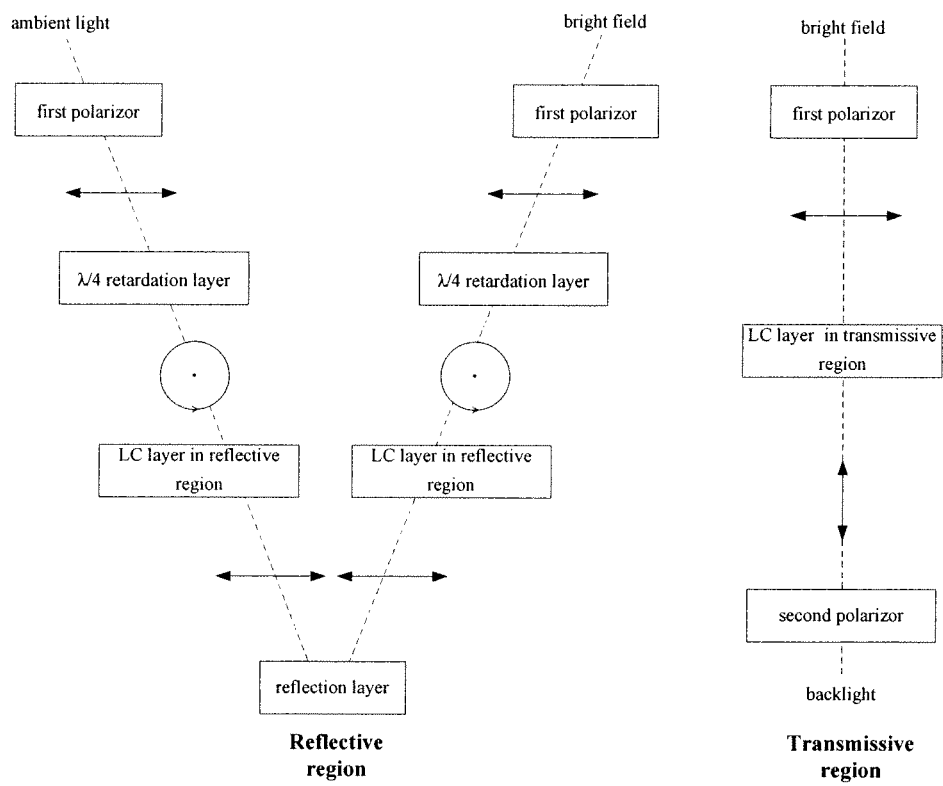
FIG. 8b schematically illustrates a graph simulating light beams under power-on state in accordance with Embodiment 2 of the invention.

Upon the voltage being applied to the liquid crystal panel, both the transmissive region and the reflective region are bright, and the detail light beam simulation graph is illustrated in FIG. 8b. In the reflective region, the transmission axis of the first polarizer 4 is in the horizontal direction, therefore the ambient light passes through the first polarizer 4 and generates light linearly polarized in the horizontal direction. The light linearly polarized in the horizontal direction is turned into LHCP light after passing through the λ/4 retardation film 12. As the liquid crystal layer 3 in the reflective region has a λ/4 optical retardation effect on the light, the LHCP light is turned into light linearly polarized in the horizontal direction after being subjected to a phase retardation the liquid crystal layer 3. The light linearly polarized in the horizontal direction is turned into LHCP light after being reflected by the metal of the reflection layer 7 and passing through the liquid crystal layer 3 in the reflective region. The LHCP is turned into light linearly polarized in the horizontal direction after passing through the λ/4 retardation film 12. At this point, the polarization direction of the light linearly polarized in the horizontal direction is the same as the transmission axis of the first polarizer 4, thereby producing a bright field in the reflective region. In the transmissive region, the transmission axis of the second polarizer 6 is perpendicular to the paper, the backlight from the backlight source is thus turned into light linearly polarized in the perpendicular direction after passing through the second polarizer 6. As the liquid crystal layer 3 in the transmissive region has a ½ optical retardation effect on the light, the light linearly polarized in the perpendicular direction is turned into light linearly polarized in the horizontal direction after passing through the liquid crystal layer 3 in the transmissive region. At this point, the polarization direction of the light linearly polarized in the horizontal direction is parallel to the transmission axis of the first polarizer 4, thereby forming a bright field in the transmissive region.

As an example, a process for fabricating the TFT array substrate of the transflective liquid crystal panel having the optical retardation film of the reflective region disposed on the color filter substrate is the same as steps (1) to (8) of the process for fabricating the TFT array substrate in accordance with Embodiment 1 and will not be elaborated here.

Figure 5D:
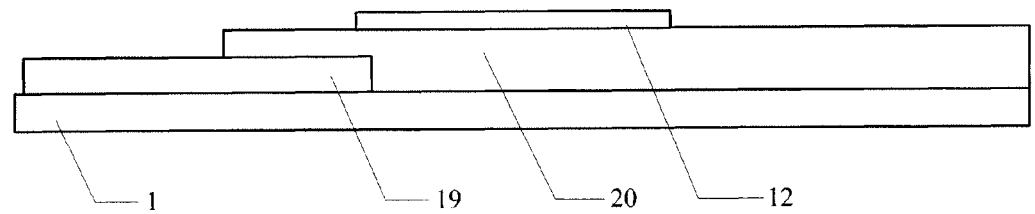
FIGS. 5d to 5f schematically illustrate each step for fabricating a color filter substrate in accordance with Embodiment 2 of the invention.
Figure 5E:
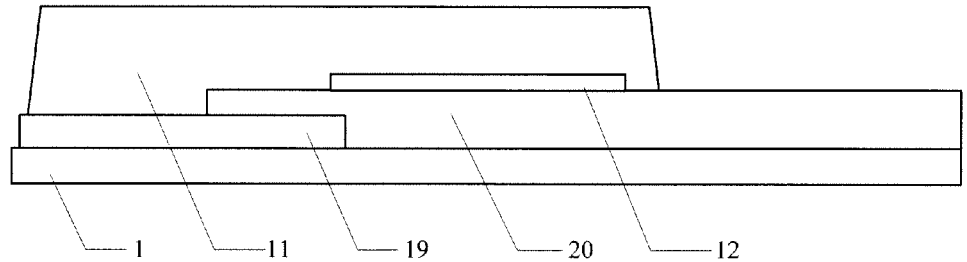
Figure 5F:
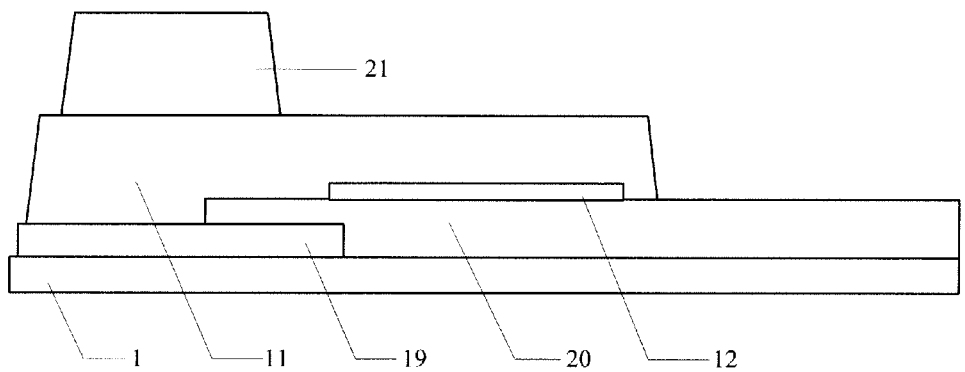

Accordingly, a process for fabricating the color filter substrate of the transflective liquid crystal panel having optical the retardation film of the reflective region disposed on the color filter substrate is the same as steps (1) and (2) of the process for fabricating the color filter substrate in accordance with Embodiment 1, and further comprises the following steps as illustrated in FIGS. 5d to 5f after completing step (2):

(4) depositing a λ/4 optical retardation film 12 on a location of the color resin (CR) layer 20 that corresponds to the reflective region as illustrated in FIG. 5d;

(5) forming a protrusion 11 on the organic resin (BM) layer 19, the color resin (CR) layer 20 and the λ/4 retardation film 12 as illustrated in FIG. 5e; and (6) form a post spacer (PS) layer 21 on the protrusion 11 as illustrated in FIG. 5f.

Figure 9:
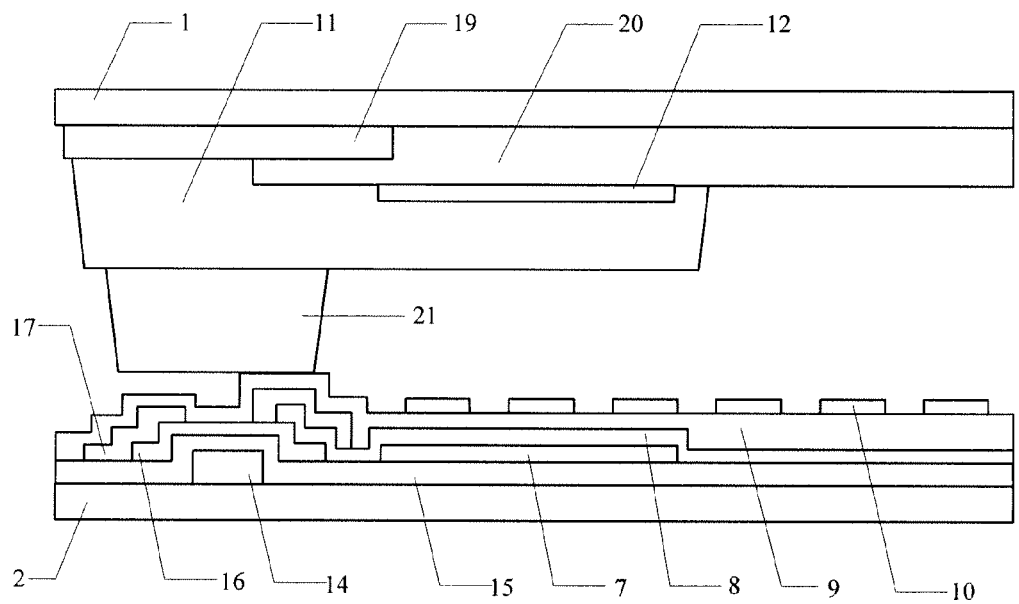
FIG. 9 schematically illustrates a configuration after cell assembly in accordance with Embodiment 2 of the invention.

After forming the TFT array substrate and the color filter substrate with the above processes, a parallel alignment agent is applied on both the color filter substrate and the TFT array substrate, to form the first alignment film and the second alignment film respectively on the color filter substrate and the TFT array substrate. Then color filter substrate and the TFT array substrate are then cell assembled to form the liquid crystal panel as illustrated in FIG. 9 (in which the first and second alignment films are not shown). The cell assembly process used in the embodiment of the invention is not distinctly different from the conventional arts and will not be elaborated here.

As an example, the optical retardation film in the above two embodiments may be a network formed by perpendicularly aligned (e.g., along a direction perpendicular to the substrates) macromolecule polymer materials. The network formed by the macromolecule polymer materials is formed by polymerization reaction of perpendicularly aligned liquid crystalline polymerizable monomers under the irradiation of UV light.

Figure 10A:
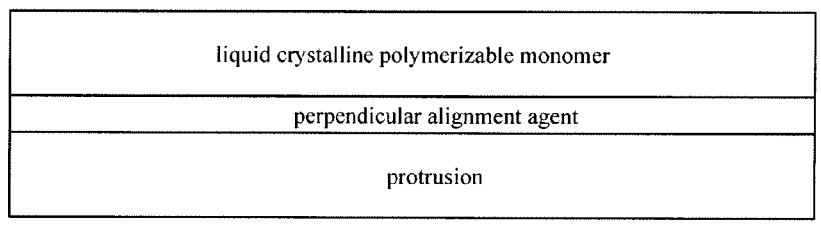
FIGS. 10a to 10c schematically illustrate each step for fabricating a retardation film in accordance with an embodiment of the invention.
Figure 10B:
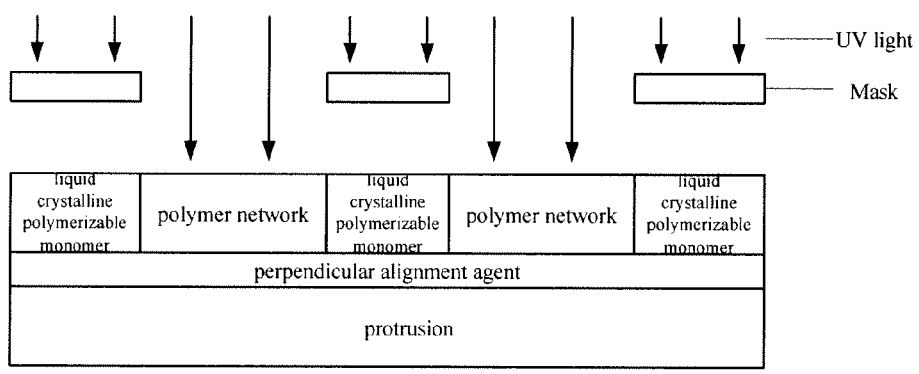
Figure 10C:
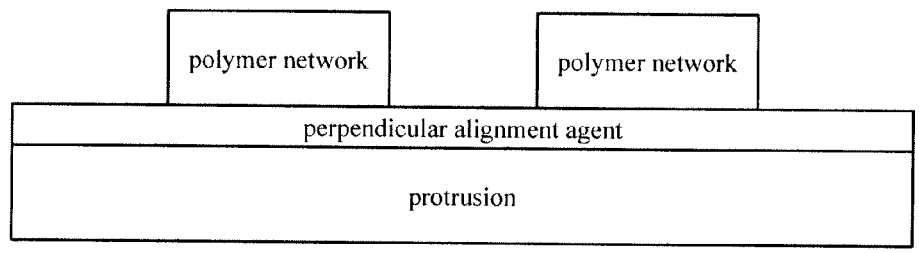

Taking the configuration of Embodiment 1 as an example, with reference to FIGS. 10a to 10c, the process for fabricating the retardation film comprises the following steps:

(1) applying a perpendicular alignment agent to the protrusion 11 and a layer of liquid crystalline polymerizable monomer to the perpendicular alignment agent as illustrated in FIG. 10a. The liquid crystalline polymerizable monomer has a double bond monomer which will undergo polymerization reaction when irradiated by the UV light to form the polymer network;

(2) irradiating the protrusion 11 having the liquid crystalline polymerizable monomer applied thereon with the UV light by using a mask such that the liquid crystalline polymerizable monomers irradiated by the UV light are polymerized to form the polymer network, thereby obtaining a required shape for the optical retardation film, as illustrated in FIG. 10b;

(3) washing the protrusion 11 with an alkalescent liquid to dissolve the not polymerized liquid crystalline polymerizable monomer, thereby obtaining the optical retardation film formed by the polymer network as illustrated in FIG. 10c.

Similarly, the optical retardation film of Embodiment 2 may be formed in the same way, which will not be elaborated here.

As an example, the array substrate comprises a plurality of gate lines and a plurality of data line intersecting with each other. The intersecting gate lines and data lines define regions for forming individual pixel units.

Figure 11:
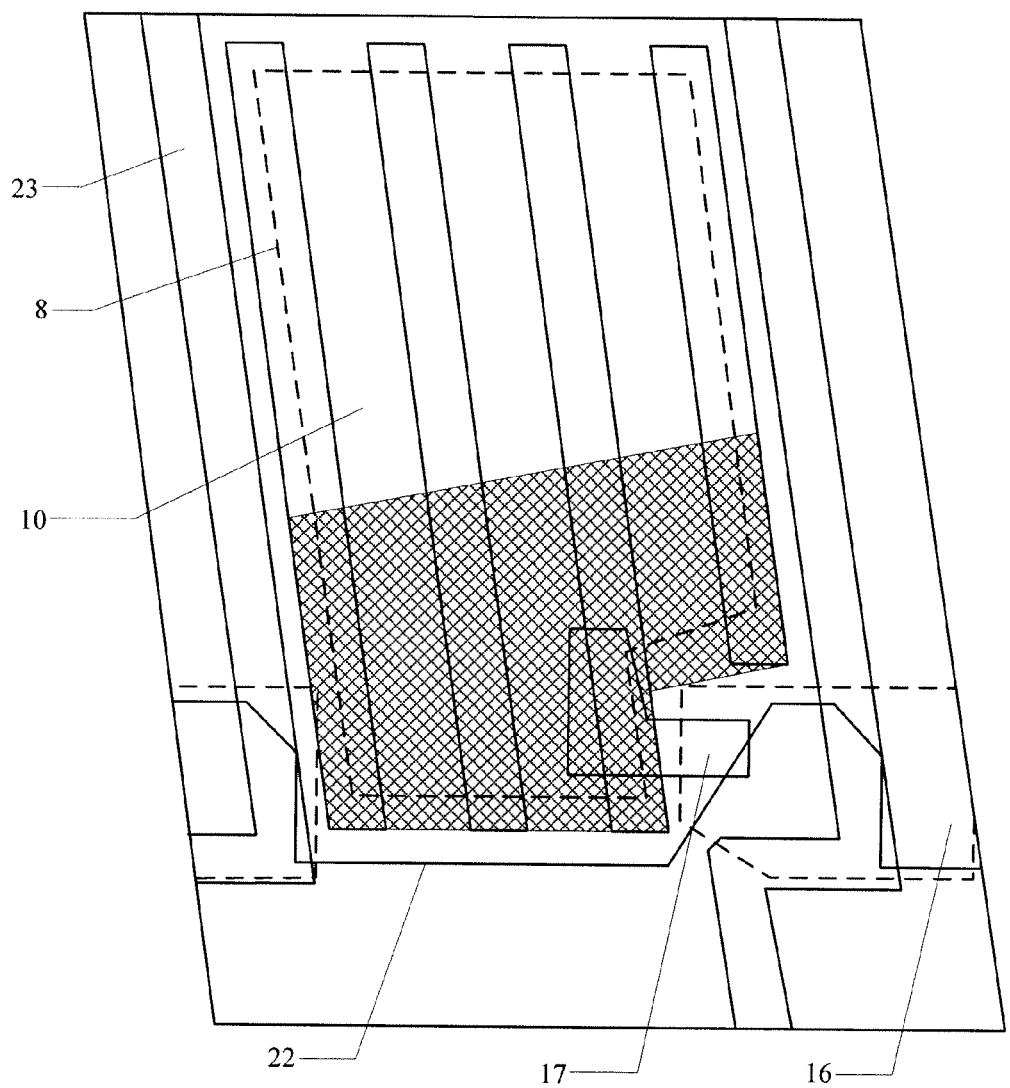
FIG. 11 is a top view of a pixel in accordance with an embodiment of the invention.

Furthermore, in the ADS display mode, the second ITO electrode 10 is normally a strip electrode. As illustrated in FIG. 11, an inclination angle between the longitudinal direction of each second ITO electrode 10 and the wiring direction of the gate lines 22 may be set to about 70° to 89°, that is, the second ITO electrode 10 is disposed obliquely. The shaded area in FIG. 11 is the reflective region, and a signal line 23 is parallel to the second ITO electrode 10.

The invention further provides a display device base on the same inventive concept, comprising the transflective liquid crystal panel based on the ADS display mode.

The embodiment of the invention provides a transflective liquid crystal panel based on ADS display mode, wherein each pixel unit has a transmissive region and a reflective region, a thickness of the liquid crystal layer in the transmissive region is larger than that of the reflective region, and a optical retardation film and a reflection layer are disposed in a region corresponding to the reflective region; wherein the optical retardation film is adapted for compensating optical retardation caused by a difference between the thicknesses of the liquid crystal layers in the transmissive and reflective region. When displaying images, as the liquid crystal layers in the transmissive and reflective regions are of different thicknesses, different retardation effects will be performed on the light beam by liquid crystal layers of different thicknesses, when the power is turned on. The difference in the optical retardation may be compensated by disposing the optical retardation film in the reflective region, such that the transmittivities in the reflective and transmissive regions in the same pixel unit match each other. Moreover, grayscales in the pixel unit may remain the same whether the electric field is ON or OFF, thereby achieving the transflective effect.

The foregoing are merely exemplary embodiments of the invention, but are not used to limit the protection scope of the invention. The protection scope of the invention shall be defined by the attached claims.

What is claimed is:

1. A transflective liquid crystal panel based on ADS display mode, comprising:
   a color filter substrate, a thin film transistor (TFT) array substrate and a liquid crystal layer disposed between the color filter substrate and the TFT array substrate,
   a plurality of pixel units being formed on the TFT array substrate; wherein, each pixel unit is provided with a transmissive region and a reflective region, a thickness of the liquid crystal layer in the transmissive region is larger than that of the reflective region; an optical retardation film and a reflection layer are disposed in a region corresponding to the reflective region; the reflection layer is disposed at a side of the TFT array substrate that faces the liquid crystal layer, the retardation film is adapted for compensating optical retardation caused by a difference between the thicknesses of the liquid crystal layer in the transmissive and reflective regions,
   wherein the TFT array substrate has a first ITO electrode and a second ITO electrode disposed on and insulated from the first ITO electrode; the reflection layer is disposed on a side of the first ITO electrode that is opposite to the second ITO electrode and directly electrically connected to the first ITO electrode; and
   wherein the array substrate comprises a plurality of gate lines and a plurality of data line intersecting with each other, the intersecting gate lines and data lines define regions forming the plurality of pixel units; the second ITO electrode is a strip electrode; an inclination angle between a longitudinal direction of each second ITO electrode and a wiring direction of the gate lines in each pixel unit is 70° to 89°.

2. The liquid crystal panel of claim 1, wherein the optical retardation film is disposed on a side of the color filter substrate that faces the liquid crystal layer, or on a side of the TFT array substrate that faces the liquid crystal layer.

3. The liquid crystal panel of claim 1, further comprises a protrusion with a thickness equal to a difference in the thicknesses of the liquid crystal layer in the transmissive region and the reflective region; the optical retardation film is disposed on the side of the color filter substrate that faces the liquid crystal layer, the protrusion is disposed on a side of the optical retardation film that faces the liquid crystal layer; or, the optical retardation film is disposed on the side of the TFT array substrate that faces the liquid crystal layer, the protrusion is disposed between the optical retardation film and the TFT array substrate.

4. The liquid crystal panel of claim 2, further comprises a protrusion with a thickness equal to a difference in the thicknesses of the liquid crystal layer in the transmissive region and the reflective region; the optical retardation film is disposed on the side of the color filter substrate that faces the liquid crystal layer, the protrusion is disposed on a side of the optical retardation film that faces the liquid crystal layer; or, the optical retardation film is disposed on the side of the TFT array substrate that faces the liquid crystal layer, the protrusion is disposed between the optical retardation film and the TFT array substrate.

5. The liquid crystal panel of claim 1, wherein the thickness of the liquid crystal layer in the transmissive region is twice that of the liquid crystal layer in the reflective region, the optical retardation film is a quarter wavelength retardation film.

6. The liquid crystal panel of claim 4, wherein the thickness of the liquid crystal layer in the transmissive region is twice that of the liquid crystal layer in the reflective region, the optical retardation film is a quarter wavelength retardation film.

7. The liquid crystal panel of claim 1, wherein the optical retardation film is a network formed by a perpendicularly aligned macromolecule polymer material; the perpendicularly aligned macromolecule polymer network is generated by polymerization reaction of perpendicularly aligned liquid crystalline polymerizable monomers under irradiation of UV light.

8. The liquid crystal panel of claim 2, wherein the TFT array substrate has a first ITO electrode and a second ITO electrode disposed on and insulated from the first ITO electrode; the reflection layer is disposed on a side of the first ITO electrode that is opposite to the second ITO electrode and electrically connected to the first ITO electrode.

9. The liquid crystal panel of claim 1, further comprises a first polarizer disposed on a side of the color filter substrate that is opposite to the liquid crystal layer, and a second polarizer disposed on a side of the TFT array substrate that is opposite to the liquid crystal layer; transmission axes of the first polarizer and the second polarizer are perpendicular to each other; upon no electric field being applied, liquid crystal molecules in the liquid crystal layer are aligned parallel to the transmission axis of the first or the second polarizer.

10. The liquid crystal panel of claim 2, further comprises a first polarizer disposed on a side of the color filter substrate that is opposite to the liquid crystal layer, and a second polarizer disposed on a side of the TFT array substrate that is opposite to the liquid crystal layer; transmission axes of the first polarizer and the second polarizer are perpendicular to each other; upon no electric field being applied, liquid crystal molecules in the liquid crystal layer are aligned parallel to the transmission axis of the first or the second polarizer.

11. The liquid crystal panel of claim 9, wherein a phase retardation amount of the optical retardation film is configured so that a polarization state of the ambient light after it passes through the first polarizer and then through the liquid crystal layer in the reflective region and the optical retardation film, is reflected by the reflection layer, and passes through the liquid crystal layer in the reflective region and the retardation film once again and arrives at the first polarizer for a second time is the same as a polarization state of the backlight after it passes through the second polarizer and then through the liquid crystal layer in the transmissive region and arrives at the first polarizer.

12. The liquid crystal panel of claim 9, wherein the transmission axes of the first polarizer and the second polarizer are respectively along two directions perpendicular to each other in a plane parallel to the color filter substrate or the TFT array substrate.

13. The liquid crystal panel of claim 1, further comprises a first alignment film and a second alignment film for alignment of the liquid crystal layer; the first alignment film is disposed on a side of the color filter substrate that faces the liquid crystal layer; and the second alignment film is disposed on a side of the TFT array substrate that faces the liquid crystal layer.

14. A display device comprising the transflective liquid crystal panel based on ADS display mode of claim 1.

15. The display device of claim 14, wherein the optical retardation film is disposed on a side of the color filter substrate that faces the liquid crystal layer, or on a side of the TFT array substrate that faces the liquid crystal layer.

16. The display device of claim 14, further comprises a protrusion with a thickness equal to a difference in the thicknesses of the liquid crystal layer in the transmissive region and the reflective region; the optical retardation film is disposed on the side of the color filter substrate that faces the liquid crystal layer, the protrusion is disposed on a side of the optical retardation film that faces the liquid crystal layer; or, the optical retardation film is disposed on the side of the TFT array substrate that faces the liquid crystal layer, the protrusion is disposed between the optical retardation film and the TFT array substrate.

17. The display device of claim 14, wherein the thickness of the liquid crystal layer in the transmissive region is twice that of the liquid crystal layer in the reflective region, the optical retardation film is a quarter wavelength retardation film.

18. The display device of claim 14, wherein the optical retardation film is a network formed by a perpendicularly aligned macromolecule polymer material; the perpendicularly aligned macromolecule polymer network is generated by polymerization reaction of perpendicularly aligned liquid crystalline polymerizable monomers under irradiation of UV light.

\* \* \* \* \*